United States Patent
Saibold et al.

(10) Patent No.: US 6,220,325 B1
(45) Date of Patent: Apr. 24, 2001

(54) AIR GUIDE FOR A TIRE PRESSURE REGULATING DEVICE

(75) Inventors: Friedrich Saibold, Friedrichshafen; Gerhard Krieg, Zwecking, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/208,226

(22) Filed: Dec. 9, 1998

(30) Foreign Application Priority Data

Dec. 20, 1997 (DE) .............................. 197 57 000

(51) Int. Cl.⁷ .................................................. B60C 23/10
(52) U.S. Cl. ............................................... 152/417
(58) Field of Search ................................ 152/415, 416, 152/417 I; 301/105.1, 108.1

(56) References Cited

U.S. PATENT DOCUMENTS

| | | | | |
|---|---|---|---|---|
| 1,800,780 | * | 4/1931 | Daneel | 152/417 |
| 2,452,527 | * | 10/1948 | Peter | 152/417 |
| 2,634,784 | * | 4/1953 | Fitch | 152/417 |
| 2,931,414 | * | 4/1960 | Jankowski | 152/417 |
| 4,804,027 | * | 2/1989 | Runels | 152/417 |
| 4,883,106 | * | 11/1989 | Schultz et al. | 152/417 |
| 4,892,128 | * | 1/1990 | Bartos | 152/417 |
| 4,932,451 | * | 6/1990 | Williams et al. | 152/417 |
| 5,174,839 | * | 12/1992 | Schultz et al. | 152/415 |
| 5,203,391 | * | 4/1993 | Fox | 152/416 |
| 5,221,381 | * | 6/1993 | Hurrell, II | 152/416 |
| 5,236,028 | * | 8/1993 | Goodell et al. | 301/105.1 |
| 5,253,687 | * | 10/1993 | Beverly et al. | 152/416 |
| 5,253,688 | * | 10/1993 | Tigges | 152/417 |
| 5,354,391 | * | 10/1994 | Goodell et al. | 301/105.1 |
| 5,377,736 | * | 1/1995 | Stech | 152/417 |
| 5,398,743 | * | 3/1995 | Bartos | 152/416 |
| 5,429,167 | * | 7/1995 | Jensen | 152/415 |
| 5,484,213 | * | 1/1996 | Caillaut et al. | 152/417 |
| 5,526,861 | * | 6/1996 | Oshita et al. | 152/415 |
| 5,535,516 | * | 7/1996 | Goodell et al. | 152/417 |
| 5,584,949 | * | 12/1996 | Ingram | 301/105.1 |
| 5,587,698 | * | 12/1996 | Genna | 152/417 |
| 5,868,881 | * | 2/1999 | Bradley | 152/417 |

FOREIGN PATENT DOCUMENTS 89 07 153     4/1989 (DE) .
0 265 296 A1  4/1988 (EP) .

* cited by examiner

Primary Examiner—S. Joseph Morano
Assistant Examiner—Long B. Nguyen
(74) Attorney, Agent, or Firm—Davis and Bujold

(57) ABSTRACT

The invention relates to an air guide through steering and rigid axles, particularly in planetary design, in rotary hubs for tire pressure regulation. A sealing ring (1) seals and air guide in the wheel head of a planetary steering axle with sealing lips against a U-shaped annular ring (2) comprising a metal wearing plate. The sealing lips of the sealing ring (1) acting in a radial direction. The sealing ring (1) is connected with a joint housing (4) and secured with pivots against distortion relative to said housing. The U-shaped ring (2) is firmly connected with the wheel hub (3) and is centered on the outer diameter by a close fit and secured against distortion relative to the wheel hub (3) and is sealed by means of O-rings (6). Between the annular, U-shaped ring (2) and the housing remains a narrow gap, the so-called labyrinth, which protects the seal against fouling.

11 Claims, 2 Drawing Sheets

AIR GUIDE FOR A TIRE PRESSURE REGULATING DEVICE

BACKGROUND OF THE INVENTION

The invention relates to an air guide through steering and rigid axles, particularly of a planetary design, to rotating hubs for regulating tire pressure.

Air guides for regulating tire pressure are known already and have been designed in different ways. German Utility Model DE 8907153 U1 describes an example of an air guide for tire pressure regulation. In this kind of air guide it is disadvantageous in that the sealing in an axial direction requires an axial sealing ring which abuts on a flat front surface of an opposite annular body which acts as sliding surface. Any axial play or elasticity when the axle is loaded (up to 1 mm) cannot be compensated.

SUMMARY OF THE INVENTION

The problem on which the invention is based is to provide an air guide for tire pressure regulation in which any axial play or elasticity can be compensated for when loading the axle. In case of failure of the seal, the wheel head should not stay under pressure or allow oil to reach from the wheel head into the air circuit. Failure of the seal must be easily detected.

According to the invention there is provided an air guide extending through steering and rigid axles, and rotary hub for tire pressure regulation, wherein a rotary sealing ring (1) which is connected with a housing part (4) of the axle is within a rotary, U-shaped ring (2), which is firmly radially sealed with the rotary hub (3), comprises sealing lips of said sealing ring (1) abutting on surfaces of said rotary hub, the U-shaped ring (2) extending in a radial direction.

Also according to the invention there is provided an axle and wheel hub assembly having an air guide extending therethrough for tire pressure regulation comprising a radially extending passage in the hub connected to an annular U-shaped ring (2) opening radially of the hub and tightly fitted thereto and an annular sealing ring (1) in sealed contact with the U-shaped ring (2) and having a radially extending opening connecting the U-shaped ring (2) with a compressed air supply passage in the axle.

The air guide for tire pressure regulation must be passed at one place in the power train of the vehicle to a part rotating at the speed of the wheel. The wheel head logically appears as the place of the air guides. An air guide for steering or rigid axles in planetary design is more problematic than for wheels directly driven by the axle shafts. The air guide must here be sealed against the oil system of the wheel head. In the air guide, according to the invention, a rotary sealing ring is connected with a housing part of th axle or with a join housing. The ring is here within a rotary, U-shaped ring firmly connected with the wheel hub. The U-shaped and sealing ring rotate against each other at the wheel speed. Here the sealing results in radial direction, that is, the sealing lips of the sealing ring abut on surfaces of the rotary, U-shaped ring the normal vector of which extends radial direction. Thereby Axial tolerances and displacements can be compensated during operation. The sealing ring is preferably in the wheel head—seen in a radial direction— outside the wheel head seal. In this case, when the seal is faulty, no oil reaches into the air line and no compressed air enters the wheel head. A metal wearing plate advantageously forms the rotary, U-shaped ring. Between the rotary, U-shaped ring and the housing preferably remains a narrow gap, the so-called labyrinth. This labyrinth between housing and wheel hub protects the seal against fouling. In case of failure of the radially outer sealing lips of the sealing ring, compressed air flows directly outwards through the labyrinth. By virtue of one or more holes which in radial direction extends through the sealing ring to the side of the sealing lips facing the housing, in case of faulty seal of the radial inner sealing lips, compressed air reaches outwardly through the seal and the labyrinth. Oil, which in case of failure of the wheel head seal, oozes from the wheel head into the air guide likewise can drain outwardly through said holes and the labyrinth. Failure of the seal like the wheel head seal is thus easily detected from outside. The U-shaped ring is preferably centered by being fitted on the inner or outer diameter and secured against distortion. The sealing ring is advantageously secured against distortion against the housing by one or more pivots distributed on the periphery which are supported in holes of the housing. The pivot here contains the air line for tire pressure regulation. The U-shaped ring is preferably sealed against the wheel hub by O-rings introduced prior to the assembly. Alternatively it can also be sealed by several O-rings which are inserted in grooves of the wheel hub. Also possible is sealing by a sealing lacquer, preferably on the centering diameter.

BRIEF DESCRIPTION OF THE DRAWING

One embodiment of the invention will now be described, by way of example, with reference to FIG. 1, which shows a section through a wheel head of a planetary steering axle with an air guide according to the invention.

DESCRIPTION OF THE PREFERRED EMBODIMENTS

Figure 1:
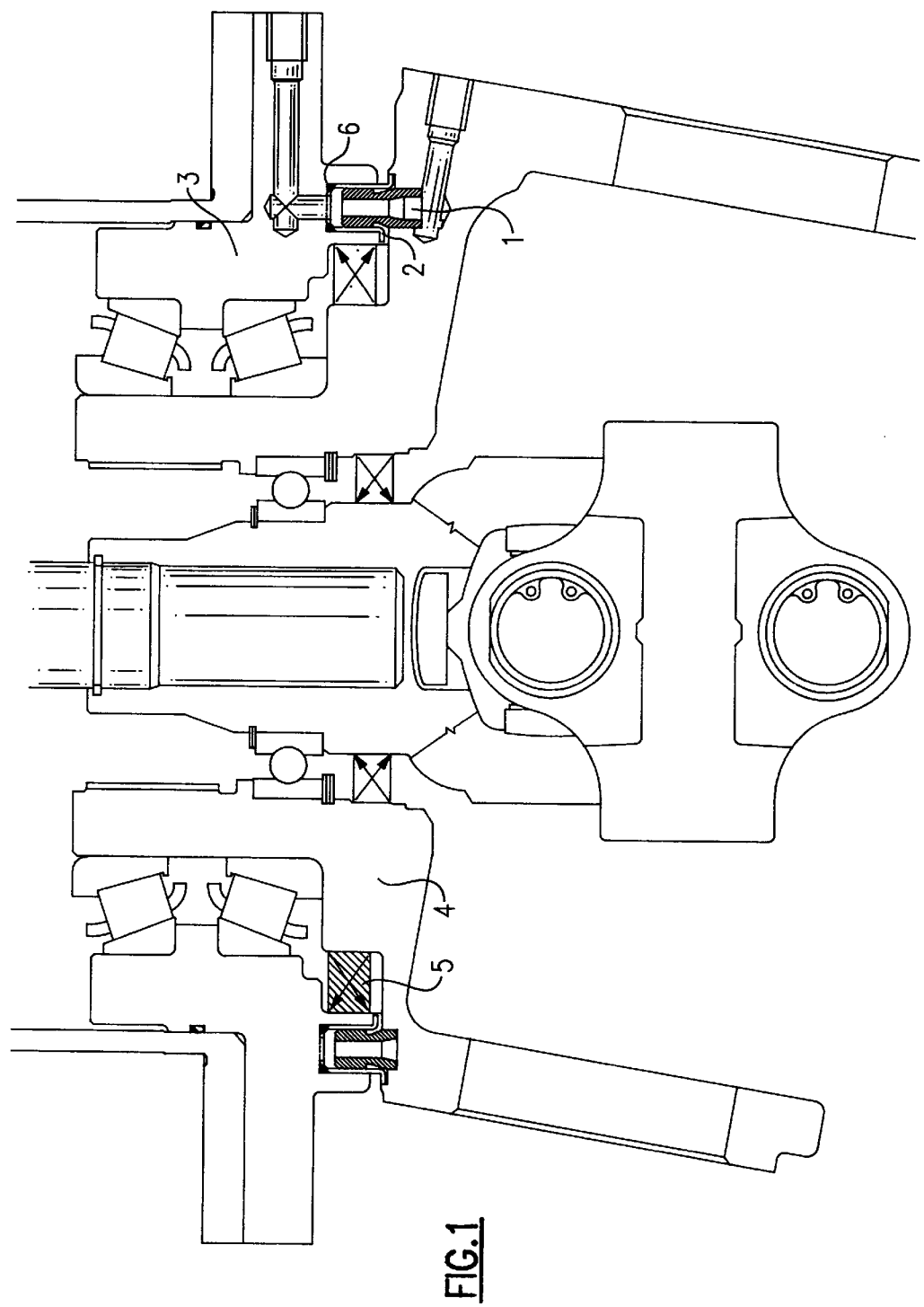
Figure 2:
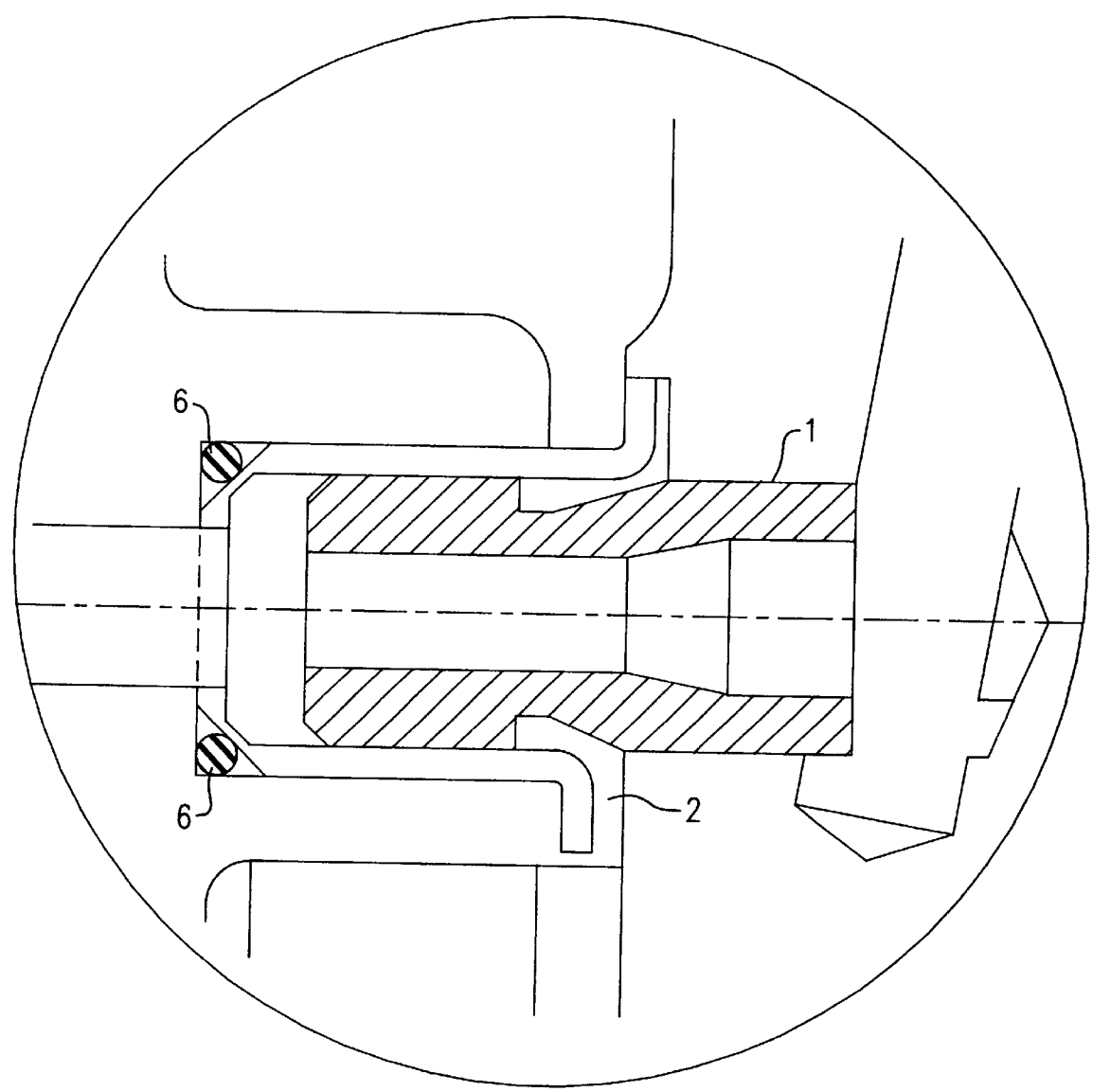
FIG. 2 is an exploded view of the O-rings located between the hub and the U-shaped ring.

One sealing ring 1 seals an air guide (FIG. 1) in the wheel head of a planetary steering axle with sealing lips against a U-shaped ring 2 comprising a metal wearing plate. The sealing lips of the sealing ring 1 abut on surfaces of the rotary, U-shaped ring 2 the normal vectors of which extend in a radial direction. The sealing ring 1 is connected with the joint housing 4. The air guide results here by a turn which projects from the joint housing 4 into an axial hole of the sealing ring 1. This turn and others are distributed over the periphery without an axial hole and sit in blind holes of the joint housing 4 securing the sealing ring 1 against distortion relative to the joint housing 4. The U-shaped ring 2 is firmly connected with the wheel hub 3 and is centered on the outer diameter by a close fit and secured against distortion relative to the wheel hub 3. The metal wearing plate is here sealed against the wheel hub 3 by O-rings 6 (FIG. 2) inserted prior to the assembly. Between the metal wearing plate designed as annular U-shaped ring 2 and the joint housing 4 remains a narrow gap, the so-called labyrinth, which protects the seal against fouling. In case of failure of the radially outer sealing lips of the sealing ring 1, the compressed air flows directly outwardly through the labyrinth. Through several holes, which extend in a radial direction through the sealing ring 1 on the sealing lips facing the joint housing 4, the compressed air, in case of faulty sealing of the radially inner sealing lips, reaches outwardly through the seal and the labyrinth. Oil, which has oozed from the wheel head into the air guide when the wheel head seal 5 fails, can likewise drain outwardly through said holes and the labyrinth. A failure of the seal like the wheel head seal 5 is thus easily detected from outside.

| Reference numeral | |
| --- | --- |
| 1 | sealing ring |
| 2 | U-shaped annular ring |
| 3 | wheel hub |
| 4 | joint housing |
| 5 | wheel head seal |
| 6 | O-rings |

What is claimed is:

1. An air guide for one of a steering and a rigid axle for tire pressure regulation, the air guide comprising:
    an axle supporting a rotatable wheel hub (3) having an annular U-shaped ring (2) rotatable about a rotational axis, and the U-shaped ring (2) having a U-shaped transverse cross-section;
    an annular sealing ring (1) which is connected with a housing part (4) of the axle and is concentrically inserted within the U-shaped ring (2) to form a fluid tight seal therebetween, and
    said sealing ring (1) having radially extending sealing lips abutting against adjacent surfaces of the U-shaped ring (2) to form the fluid tight seal.

2. The air guide according to claim 1, wherein said rotary hub has a wheel head which accommodates both a wheel head seal (5) and said sealing ring (1), and the wheel head seal (5) is located radially inwardly of the sealing ring (1).

3. The air guide according to claim 1, wherein said rotary, U-shaped ring (2) is made of metal.

4. The air guide according to claim 1, wherein between said rotary, U-shaped ring (2) and said housing there is a narrow annular gap.

5. The air guide according to claim 1, wherein said ring (1) has at least opening which extends in radial direction through said sealing ring (1) and is in the housing side of the sealing lips.

6. The air guide according to claim 1, wherein said U-shaped ring (2) is centered and secured by a close fit against the rotary hub.

7. The air guide according to claim 1, wherein said sealing ring (1) is secured against distortion by at least one pivot which is supported in a hole of said housing, one pivot containing the air line air guide for the tire pressure regulation.

8. The air guide according to claim 1, wherein said U-shaped ring (2) is sealed against said wheel hub (3) with at least one O-ring (6) in grooves of said wheel hub (3).

9. The air guide according to claim 1, wherein said U-shaped ring (2) is sealed against said wheel hub (3) with sealing lacquer.

10. The air guide of claim 1, wherein the rotary hub is a planetary design.

11. An axle and wheel hub assembly having an air guide extending therethrough for tire pressure regulation comprising a radially extending passage in the hub connected to an annular U-shaped ring (2) opening radially of the hub and tightly fitted thereto and an annular sealing ring (1) in sealed contact with the U-shaped ring (2) and having a radially extending opening connecting the U-shaped ring (2) with a compressed air supply passage in the axle.

* * * * *